2,811,420

CHLORINE DIOXIDE GENERATION

John C. Pernert, Niagara Falls, N. Y., assignor to Hooker Electrochemical Company, Niagara Falls, N. Y., a corporation of New York No Drawing. Application November 17, 1954, Serial No. 469,535

6 Claims. (Cl. 23—152)

This invention relates to an improved process for the production of chlorine dioxide and is more particularly directed to the utilization of chloric acid as an input reactant to produce chlorine dioxide with a minimum expenditure of extra acid values and a minimum production of by-products.

Heretofore, chlorine dioxide has been produced from sodium chlorate or other metal salts of chloric acid. These processes each require that the reaction, reduction of metal chlorate, take place under strongly acidic conditions in the presence of a reducing agent and a gaseous diluent. The strongly acidic conditions are obtained by providing a substantial excess of an acid, usually a mineral acid, which becomes diluted and contaminated with by-products of the reaction. This is to be expected, since the chlorate is introduced as a metal salt, usually the sodium salt, and this metal ion forms a salt with the acid. Because this metal salt of the acid is present, it is necessary to add water as a diluent and recovery of the acid, or utilization of the metal values require extensive purification techniques. The mere disposal of this acidic mixture as a waste by-product presents serious problems. Another disadvantage of these processes is the overall efficiency of the chlorate to chlorine dioxide produced. An efficiency of some 70–85 percent has been considered approximately the maximum attainable, due to the production of chlorine and loss of unreacted chlorate ion.

It is, therefore, an object of the present invention to provide a process for the production of chlorine dioxide which requires considerably less acid added as a reaction medium than prior art processes.

Another object of the present invention is to provide a process for the production of chlorine dioxide which is simple and efficient in operation and maintenance.

Still another object of the present invention is to provide a process for the production of chlorine dioxide which is capable of producing chlorine dioxide in its relatively pure state substantially uncontaminated with chlorine.

A further object of the present invention is the recovery of substantially all of the acid values in the process either in recycle or as a utilizable by-product, as for example, direct use in the manufacture of the input chloric acid of the present invention.

Another object of the present invention is to provide a process for the production of chlorine dioxide from chloric acid which gives a high overall yield of chlorine dioxide based on the chlorate ion used by recovery and recycling of unreacted chlorate ion.

Other objects will become apparent hereinafter.

The foregoing and additional objects are accomplished by providing a solution of aqueous chloric acid ($HClO_3$) which is introduced into a reaction zone containing chloric acid admixed with a strong non-reducing mineral acid. A reducing agent is then added, preferably along with an inert gaseous diluent, and substantially pure chlorine dioxide is withdrawn. The reaction begins almost instantaneously with the admission of the reducing agent and being exothermic in nature proceeds without addition of external heat. The gases evolved during reaction are withdrawn or swept out by circulating sufficient air or other inert gaseous diluent to maintain the mixture below that concentration at which spontaneous decomposition will occur. The operation may also be carried out safely by maintaining the gaseous products at a low pressure, as by use of a partial vacuum.

The process is particularly adaptable to the use of sulfur dioxide as the reducing agent and of sulfuric acid as the strong mineral acid. In conjunction with the processes described and claimed in my copending application Serial 455,063, the maximum advantages are attained.

The following empirical equation represents the reaction which occurs within the reaction zone:

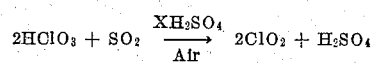

$$2HClO_3 + SO_2 \xrightarrow[\text{Air}]{XH_2SO_4} 2ClO_2 + H_2SO_4$$

While the equation above and the description utilizes sulfur dioxide as a preferred example of the reducing agent, other reducing materials are within the scope of the invention, such as, for example, manganese oxide, lead oxide, organic aldehydes and alcohols, hydrogen peroxide, oxalic acid, sugars, et cetera. Similarly, other acids than sulfuric acid may be employed, such as, for example, nitric, phosphoric, et cetera, however, sulfuric acid is preferred because of the economic advantages.

A convenient method of sweeping the generator is to pass air through the reaction mixture to cause the chlorine dioxide to be carried out. Other gaseous diluents may be used, if desired, however, air is preferred. The amount of gaseous diluent is that sufficient to prevent spontaneous explosive decomposition of chlorine dioxide and desirably is in excess over this amount. The use of reduced pressures within the reactor also provides a method for withdrawing the gaseous products without allowing a build-up of dangerous concentrations of chlorine dioxide.

In order to maintain a high order of efficiency, the amount of reducing agent is somewhat less than equivalent to the amount of chloric acid introduced and not an excess. When less than an equivalent of reducing agent is used, unreacted chloric acid will be carried through but this will be recovered and recycled, which is an important advantage of the present invention. Acidity within the reaction zone is maintained so that the acid normality is above about 6.0, preferably above 9.0. The reaction is exothermic, however, the reaction mixture is stable up to about eighty degrees centigrade and the reaction proceeds satisfactorily as low as zero degrees centigrade. Thus, the reaction temperatures may be varied considerably. Particular temperatures can be achieved by regulating the reaction rate through the reactant input rate, as well as the use of cooling means. Chloric acid, as a starting material can be from any suitable source, must be in aqueous solution containing sufficient water for stability. Solutions containing more than about 37 percent $HClO_3$ are somewhat unstable. Solutions as dilute as five percent are operative, although for convenience in handling more concentrated solutions are preferred.

By providing a means for removing spent reactor liquid from the generator, the liquid level within the reactor can be maintained constant. This reactor liquid, which with the gas removed, constitutes the only reactor effluent, can be so treated as to produce a chloric acid input solution. Surprisingly, the liquid effluent is not appreciably decomposed by heating, even above ninety degrees centigrade. The loss of chloric acid by decomposition during evaporation of water at 115 degrees centigrade (approximately boiling point at atmospheric pressure)

with vigorous agitation is less than ten percent. Therefore, the effluent can be concentrated by evaporation of water without serious loss of the components. Reduced pressure is preferably employed for ease of operation and economy. The amount of required evaporation will be dependent upon many factors such as evaporation within the generator, concentration of chlorate ion, acidity, et cetera, but generally less than about 25 percent of the liquid so treated is evaporated off as water vapor.

A portion of the liquid effluent removed is divided off, and this portion may be treated as described and claimed in my copending application Serial 455,063 with sodium chlorate, and the resulting solution cooled to cause crystal formation and these crystals removed. The amount of sodium chlorate employed will be approximately that required to form sodium sulfate with the sulfate ions present, or stated another way, the ratio of sodium to sulfate ions in solution will be about 2 to 1. Upon cooling to minus fifteen (—15) degrees centigrade, or lower, sodium sulfate crystals will form which can be removed in any convenient manner, as by filtration, decantation, centrifugation, et cetera. This sodium sulfate has an economic value, or can be disposed of easily, as contrasted with the acidic sulfate materials produced by prior art methods.

The liquor which remains after the crystals have been removed will contain chloric acid and is useful as input material for the process of the present invention. It may be used as such, or combined with the evaporated portion, and added as feed. It is to be understood, however, that this is only one method of providing the chloric acid solutions as feed for the process, and that other aqueous solutions of chloric acid containing between five and forty percent chloric acid are suitable. The presence of inert contaminants in the feed solution does not seem to affect the process and this constitutes an additional advantage thereof.

When the generator is operated at its best efficiency, the chlorine dioxide will be in a ratio to chlorine of higher than ninety to ten. Because all chlorate ion can be recycled to the generator, the liquid effluent from the generator being subject to treatment for recycle, the chlorate efficiency will be approximately 100 percent. All hydrogen ion introduced is also subject to recycle and there will be little if any loss of this. It will thus be seen that a process for the production of chlorine dioxide has been provided which results in a substantially complete utilization of all required chemical materials.

The following examples are illustrative of the novel process of the present invention, but are not to be construed as limiting.

*Example 1.—Preparation of chlorine dioxide*

A solution of chloric acid having the composition:

SOLUTION "A"

| | | |
|---|---|---|
| $HClO_3$ | grams per liter | 281.3 |
| $H_2SO_4$ | do | 1.2 |
| $Na_2SO_4$ | do | 78.2 |
| $H_2O$ | do | 846.0 |
| Specific gravity at 20° C | | 1.207 |
| Acidity | Normal | 3.35 | was diluted with sulfuric acid ($H_2SO_4$, fifty percent aqueous), sodium bisulfate ($NaHSO_4$, anhydrous), and water ($H_2O$) to produce a solution which is used as the "pre-charge" in a chlorine dioxide generator. The composition was:

SOLUTION "B"

| | | |
|---|---|---|
| $HClO_3$ | grams per liter | 42.5 |
| $H_2SO_4$ | do | 468.0 |
| $Na_2SO_4$ | do | 238.0 |
| $H_2O$ | do | 701.0 |
| Specific gravity at 20° C | | 1.450 |
| Acidity | Normal | 10.05 |

One liter of "pre-charge" solution B was charged into a six-hole, two-liter flask equipped with (1) an inlet for the solution prepared as feed, (2) an air inlet, (3) a sulfur dioxide inlet, (4) an opening for a thermometer, (5) an aqueous effluent outlet, and (6) a gaseous effluent outlet, provided with a water aspirator. The air inlet (2) is provided with a flow meter in the line. The generator, the two-liter flask, was immersed in a water bath for cooling.

A synthetic feed solution was prepared to approximate the composition of a mixture of solution "A" and the aqueous concentrated effluent (5) from the generator. The ratio based on a one to four recycle to feed gave a feed solution which had the following composition:

SOLUTION "C"

| | | |
|---|---|---|
| $HClO_3$ | grams per liter | 85.0 |
| $H_2SO_4$ | do | 446.0 |
| $Na_2SO_4$ | do | 240.0 |
| $H_2O$ | do | 687.0 |
| Specific gravity at 20° C | | 1.458 |
| Acidity | Normal | 10.1 |

The feed solution "C" was placed in a graduated funnel and its rate of flow was controlled to a stop cock.

The aspirator was started and adjusted to produce an inflow of air of approximately three liters per minute (180 liters per hour). Feed solution "C" was introduced at the rate of ten milliliters per minute (0.6 liter per hour). Sulfur dioxide was introduced and the flow adjusted to approximately 130 milliliters per minute (7.8 liters per hour-twenty grams per hour). After a few minutes of operation, the reaction mixture became yellow in color and a yellow gaseous reaction product was copiously evolved. The temperature of the reaction mixture rose at a moderate rate from an initial temperature of 28 degrees centigrade to about 37 degrees centigrade in a little less than one hour. The temperature was maintained thereafter at 35 degrees centigrade by circulating cooling water in the water bath around the generator.

Gaseous products withdrawn were analyzed from time to time and found to contain chlorine dioxide and chlorine in the ratio:

| | Percent by volume |
|---|---|
| $ClO_2$ | 88–92 |
| $Cl_2$ | 12–8 |

These components were, of course, diluted by several volumes of air. Liquid effluent was withdrawn from time to time and was found to have a constant composition:

SOLUTION "D"

| | | |
|---|---|---|
| $HClO_3$ | grams per liter | 42.4 |
| $H_2SO_4$ | do | 478.4 |
| HCl | do | 0.1 |
| $Na_2SO_4$ | do | 235.0 |
| $H_2O$ | do | 700.0 |
| Specific gravity | | 1.456 |
| Acidity | Normal | 10.3 |

*Example 2.—Concentrations for recycle solution*

Solution "D" from Example 1 above was distilled in a conventional distillation apparatus to evaporate water from the solution. The apparatus comprises a one-liter flask provided with two openings, one for a thermometer and the others for vapors. The vapor outlet was connected to a water-cooled condenser which, in turn, discharged into a 250-milliliter flask receiver which was maintained under reduced pressure by a water aspirator.

Three-fourths liter of solution "D" from Example 1 was placed in the distilling flask and the system evacuated to a pressure of about four centimeters of mercury absolute. The solution was heated and at about 43 degrees centigrade yellow gases were observed to begin to evolve. The solution boiled at 47 degrees centigrade. Evaporation of water continued rapidly at a pressure of about ten millimeters of mercury pressure absolute. During the first few minutes of evaporation the yellow color of the initial charge of solution "D" was observed to disappear. After thirty minutes, the temperature of the boiling solution increased to 75 degrees centigrade. About 160 milliliters of water had been evaporated. The process was discontinued and the solution allowed to cool. The concentrated solution analyzed:

SOLUTION "E"

| | |
|---|---|
| $HClO_3$ grams per liter | 53.2 |
| $H_2SO_4$ do | 604.9 |
| $Na_2SO_4$ do | 297.0 |
| $HCl$ do | Nil |
| $H_2O$ do | 613.0 |
| Specific gravity at 20° C | 1.568 |
| Acidity Normal | 12.97 |

*Example 3.—Preparation of chlorine dioxide*

Example 1 was repeated except that a feed solution was prepared from a mixture of solution "A" and the aqueous concentrated effluent "E" from the generator, and because of the greater concentration, the feed ratio was reduced to .428 liter per hour. All other conditions were the same. The ratio based on a one to four recycle gave feed solution which had the following composition:

SOLUTION "F"

| | |
|---|---|
| $HClO_3$ grams per liter | 119.0 |
| $H_2SO_4$ do | 434.5 |
| $Na_2SO_4$ do | 235.6 |
| $H_2O$ do | 683.0 |
| Specific gravity at 20° C | 1.472 |
| Acidity Normal | 10.3 |

The gaseous products withdrawn were analyzed from time to time and found to contain chlorine dioxide and chlorine in the ratio:

| | Percent by volume |
|---|---|
| $ClO_2$ | 88–92 |
| $Cl_2$ | 12–8 |

*Example 4.—Use of generator effluent as feed*

A 240-milliliter portion of solution "D" (effluent from generator in Example 1) was admixed with 250 grams of $NaClO_3$ and 690 grams of water to give a solution having the composition:

SOLUTION "G"

| | |
|---|---|
| $HClO_3$ grams per liter | 205.2 |
| $NaClO_3$ do | 7.5 |
| $HCl$ do | 0.02 |
| $Na_2SO_4$ do | 214.0 |
| $H_2O$ do | 840.0 |
| Specific gravity at 20° C | 1,266 |
| Acidity Normal | 2.43 |

This solution was cooled to minus twenty-five (−25) degrees centigrade and the solids filtered off. The composition of the filtrate was:

SOLUTION "H"

| | |
|---|---|
| $HClO_3$ grams per liter | 290.5 |
| $NaClO_3$ do | 12.8 |
| $HCl$ do | 0.03 |
| $Na_2SO_4$ do | 70.5 |
| $H_2O$ do | 844.0 |
| Specific gravity at 20° C | 1.218 |
| Acidity Normal | 3.44 |

The volume of the filtrate recovered was 0.702 liter. The composition of solids filtered off had the following composition:

| | Grams |
|---|---|
| $Na_2SO_4.10H_2O$ | 372 |
| $H_2O$ (ice) | 36 |

(retained in the solids was 0.15 percent acid as $HClO_3$ and 0.15 percent chlorate). This material may be used directly as feed or combined with the concentrated solution of Example 2 to provide sufficient sulfuric acid to maintain the reaction.

Various modifications may be made in the present invention without departing from the spirit or scope thereof and it is to be understood that I limit myself only as defined in the appended claims.

I claim:

1. A continuous process for the production of chlorine dioxide and the economic recovery of by-products which comprises: providing an aqueous solution of sulfuric acid; introducing a reducing agent and an aqueous solution of chloric acid into said sulfuric acid thereby to provide a reaction mixture; simultaneously removing chlorine dioxide formed, continuously removing a portion of said reaction mixture in an amount approximately equal to the introduction of reactants into said reaction mixture; dissolving sodium chlorate in said removed portion and cooling the resulting solution to a temperature below minus fifteen degrees centigrade thereby forming a mother liquor of chloric acid and crystals of hydrated sodium sulfate; separating said crystals; and, returning said mother liquor to said reaction mixture.

2. A continuous process for the production of chlorine dioxide and the economic recovery of by-products which comprises: providing an aqueous solution of sulfuric acid; introducing a reducing agent and an aqueous solution of chloric acid into said sulfuric acid solution thereby to form a reaction mixture; simultaneously removing chlorine dioxide formed, continuously removing an amount of the reaction mixture approximately equal to the amount introduced into said reaction mixture; separating at least a part of the removed reaction mixture into two portions; removing at least a part of the water from one portion to yield a concentrated effluent (A); dissolving sodium chlorate in the remaining portion to form a relatively concentrated solution of chlorate ion; cooling this solution to a temperature below about minus fifteen degrees centigrade to form crystals of hydrated sodium sulfate; separating said crystals to leave a chloric acid solution (B); returning concentrated effluent (A) and chloric acid solution (B) to said reaction mixture.

3. A continuous process for the production of chlorine dioxide and the economic recovery of by-products which comprises: providing an aqueous solution of sulfuric acid; introducing sulfur dioxide and an aqueous solution of chloric acid into said sulfuric acid solution thereby to form a reaction mixture; simultaneously removing chlorine dioxide formed; removing an amount of the reaction mixture approximately equal to the amount of reactants introduced; dividing said removed reaction mixture into two portions; removing at least a part of the water from one portion to yield a concentrated effluent A; dissolving sodium chlorate in the remaining portion, and cooling the resulting solution to a temperature below minus fifteen degrees centigrade, thereby to form a mother liquor and crystals of hydrated sodium sulfate; separating the crystals of sodium sulfate thereby to leave a mother liquor of chloric acid solution B; combining concentrated effluent A and chloric acid solution B; and, returning the combined liquors to the reaction mixture.

4. A continuous process for the production of chlorine dioxide and the economic recovery of by-products which comprises: providing an aqueous solution of sulfuric acid; introducing sulfur dioxide and an aqueous solution of chloric acid into said sulfuric acid solution thereby to form a reaction mixture; simultaneously removing chlorine dioxide as formed, removing at least a part of the reaction mixture in amount approximately equal to the amount of reactants introduced; dividing the removed reaction mixture in two portions to yield a concentrated effluent; returning this effluent to said reaction mixture dissolving sodium chlorate in the remaining portion and cooling the resulting solution to a temperature below about minus fifteen degrees centigrade, thereby to form crystals of hydrated sodium sulfate and an aqueous solution of chloric acid; separating said crystals; and, returning said aqueous solution of chloric acid to said reaction mixture.

5. A continuous process for the production of chlorine dioxide and the economic recovery of by-products which comprises: providing an aqueous solution of sulfuric acid; introducing sulfur dioxide and an aqueous solution of chloric acid into said sulfuric acid solution thereby to form a reaction mixture; simultaneously removing chlorine dioxide as formed, removing a part of the reaction mixture in amount approximately equal to the amount of reactants introduced; dissolving in said removed reaction mixture an amount of sodium chlorate sufficient to cause a resulting solution having a mole ratio of sodium to sulfate of approximately two to one; cooling said resulting solution to a temperature below about minus fifteen degrees centigrade to form crystals of hydrated sodium sulfate and a mother liquor of chloric acid; separating said crystals; and returning said mother liquor to said reaction mixture.

6. A continuous process for the production of chlorine dioxide and the economic recovery of by-products which comprises: providing an aqueous solution of sulfuric acid; introducing sulfur dioxide and an aqueous solution of chloric acid into said acid solution thereby to form a reaction mixture; simultaneously removing chlorine dioxide, as formed in said reaction mixture; removing at least a part of the liquid reaction mixture in an amount approximately equal to the amount of reactants introduced; dividing said removed reaction mixture into two portions; removing a part of the water from one portion to yield a concentrated effluent A; dissolving the remaining portion with an amount of sodium chlorate sufficient to cause the resulting solution to have a dissolved mole ratio of sodium to sulfate of approximately two to one; cooling said resulting mixture to a temperature below minus fifteen degrees centigrade to form crystals of hydrated sodium sulfate and a mother liquor of chloric acid; separating said crystals; returning said mother liquor and said concentrated effluent to said reaction mixture.

References Cited in the file of this patent

UNITED STATES PATENTS

| | | |
|---|---|---|
| 2,332,181 | Soule | Oct. 19, 1943 |
| 2,376,935 | Persson | May 29, 1945 |

OTHER REFERENCES

"Fiat Final Report 825," page 1. Office of Military Government for Germany (U. S.).